US009622161B1

United States Patent
Law et al.

(10) Patent No.: US 9,622,161 B1
(45) Date of Patent: Apr. 11, 2017

(54) SYSTEMS AND METHODS FOR OBTAINING AVAILABLE CHANNELS FOR FAST CHANNEL SWITCHING (71) Applicant: Belden, Inc., St. Louis, MO (US)

(72) Inventors: Lap Kong Law, Dublin, CA (US); Daniel Wade, Pleasanton, CA (US)

(73) Assignee: BELDEN, INC., St. Louis, MO (US)

( * ) Notice: Subject to any disclaimer, the term of this patent is extended or adjusted under 35 U.S.C. 154(b) by 0 days.

(21) Appl. No.: 14/921,912

(22) Filed: Oct. 23, 2015

(51) Int. Cl.
| | |
|---|---|
| *H04W 4/00* | (2009.01) |
| *H04W 48/16* | (2009.01) |
| *H04L 29/08* | (2006.01) |
| *H04W 72/12* | (2009.01) |
| *H04W 16/14* | (2009.01) |
| *H04W 24/02* | (2009.01) |
| *H04W 24/08* | (2009.01) |

(52) U.S. Cl.
CPC ......... *H04W 48/16* (2013.01); *H04L 69/324* (2013.01); *H04L 69/325* (2013.01); *H04W 16/14* (2013.01); *H04W 72/12* (2013.01); *H04W 24/02* (2013.01); *H04W 24/08* (2013.01)

(58) Field of Classification Search
CPC ..... H04W 16/14; H04W 24/00; H04W 24/10; H04W 48/16; H04W 72/04; H04W 72/0486; H04W 72/082; H04W 16/04; H04W 88/08
See application file for complete search history.

(56) References Cited

U.S. PATENT DOCUMENTS

| | | | | |
|---|---|---|---|---|
| 7,573,857 | B1* | 8/2009 | Radhakrishnan | H04W 48/20 370/336 |
| 8,654,782 | B2* | 2/2014 | Meil | H04W 48/16 370/444 |
| 2004/0156336 | A1* | 8/2004 | McFarland | H04L 1/22 370/329 |
| 2005/0272435 | A1* | 12/2005 | Tsien | G01S 7/021 455/450 |
| 2014/0003237 | A1* | 1/2014 | Kenney | H04W 28/10 370/235 |
| 2016/0087897 | A1 | 3/2016 | Hardt | |

OTHER PUBLICATIONS

International Search Report and Written Opinion for PCT/US2016/057501 dated Nov. 21, 2016.
Office Action on U.S. Appl. No. 15/295,771 dated Dec. 12, 2016.

\* cited by examiner

*Primary Examiner* — Olumide T Ajibade Akonai
(74) *Attorney, Agent, or Firm* — Daniel Rose; Foley & Lardner LLP (57) ABSTRACT

The present disclosure is directed generally to systems and methods for scheduling dynamic frequency selection channel availability checks. The systems and methods may include detecting lull times in between servicing clients, and scanning for channel availability during the lull times.

20 Claims, 6 Drawing Sheets

| Channel 510 | Frequency 515 | Available? 520 | Last checked time 525 | Duration of last check 530 | Total duration checked in last 24 hours 535 | Time of last identified interference 540 |
|---|---|---|---|---|---|---|
| 48 | 5240 | Yes | 12:00:35 | 2 seconds | 10 minutes | - |
| 52 | 5260 | No | 12:00:37 | 10 seconds | 15 minutes | 12:00:47 |
| 100 | 5500 | Yes | 12:00:50 | 60 seconds | 30 minutes | 04:15:00 |
| ooo | | | | | | |

Available Channel List
505

SYSTEMS AND METHODS FOR OBTAINING AVAILABLE CHANNELS FOR FAST CHANNEL SWITCHING

FIELD

The present application generally relates to wireless communication. In particular, the present application relates to systems and methods for fast channels switching in Dynamic Frequency Selection (DFS) allocation schemes.

BACKGROUND

Some regulatory domains have reserved specific frequencies for reserved uses, e.g. weather and military applications. Regulatory domains may require devices communicating on the regulated frequencies to cease communication when radar is detected so as to not disrupt the different uses. A first device may communicate with a second device wirelessly over a regulated frequency. The devices may detect radar on the regulated frequency and terminate communication on the regulated frequency. The devices may communicate in a different frequency. Regulatory domains may also require a scanning a regulated frequency for a set time period before using it to communicate.

BRIEF SUMMARY

Communications channels may be unregulated and free for use by wireless devices, or regulated or reserved for specified uses, such as weather or military radar. In some instances of dynamic frequency allocation (DFS) schemes, wireless devices may be allowed to operate on regulated channels, provided they do not interfere with reserved uses. There are various regulatory domains such as Federal Communications Commission (FCC), European Telecommunications Standards Institute (ETSI), Japanese regulatory agency e.g. MKK, Korean regulatory agency, etc. These regulatory domains mandate that a device must perform a Channel Availability Check (CAC) on a regulated channel before starting operations on the channel to ensure that there are no radars operating on the channel. The device may be, for instance, an access point, wireless gateway, or other such device. For example, one set of regulated channels in the United States include the frequencies between 5250 MHz and 5350 MHz, or between 5470 MHz and 5725 MHz. Mobile devices and WiFi access points may use these frequencies unless and/or until they detect interference from weather or military radar, at which point they must cease operations for a period of time equal to the Non-Occupancy Period and until a successful CAC is performed.

The duration of a CAC may be between several seconds to several minutes. For instance, some regulatory regimes require a CAC of sixty seconds, while others require a CAC of ten minutes. After scanning for the prescribed duration, if no radar signal has been detected, the channel becomes an "available channel", and the device may use the channel to communicate with other devices, such as client devices (e.g. stations). If the device detects a radar signal on the channel during the CAC or during service, the device must stop transmitting on the channel and the channel will become an "unavailable channel" for some time. In some regulatory systems, the channel remains an unavailable channel for up to 30 minutes or more.

During operation on a regulated channel, when a device detects a radar signal, the device has to pause service to any client devices. The device must scan for an additional amount of time that is defined by the regulations in order to resume service on another regulated channel. For instance, if a regulated frequency requires sixty seconds of scanning, the service will be interrupted for the sixty seconds while the device performs a CAC. The device may have to perform more than one CAC to search for an available channel since the first CAC may result in an unavailable channel due to detecting radar. For mission-critical networks, such as industrial networks, such a service interruption is unacceptable.

In the present application, the device maintains a list of available channels, also referred to as list of backup channels. When a radar signal has been detected, the device will immediately switch to one of the available channels to minimize service down-time. There are several methods to create and maintain the list of available channels. In pre-service scanning, a device performs CAC on one or more Usable Channels to determine the available channel list. Usable Channels may include any channels that are regulated that may potentially be used by the device. In in-service scanning, a device performs frequent and short Off-Channel CAC on one or more Usable Channels during the service to determine the available channel list. To minimize service interruption during the Off-Channel CAC, the device will determine the appropriate scanning schedule based on various factors such as the number of clients with active communication sessions, traffic type and traffic load. In off-line scanning, a device may be out-of-service in specific time of day (e.g., during late night). An administrator can manually configure the out-of-service schedule for the device. The device can make use of this time to perform CAC on one or more Usable Channels to create the available channel list.

The present application is directed to methods and systems for scheduling dynamic frequency selection channel availability checks. The systems and methods may include detecting lull times in between servicing clients, and scanning for channel availability during the lull times.

At least one aspect of the present disclosure is directed to a method for scheduling dynamic frequency selection channel availability checks. In one aspect, the present application is directed to monitoring, by a wireless access point, wireless traffic traversing the wireless access point from one or more wireless client devices. The method may include determining, by the wireless access point, to perform an off-channel availability check, based on the monitored wireless traffic and selecting, by the wireless access point, a backup channel of a list of one or more backup channels. The method may further include scanning, by the wireless access point, the selected backup channel for radar for a predetermined time period, responsive to the determination.

In some embodiments, the method includes identifying that the monitored wireless traffic does not include an indication of priority above a predetermined threshold. In some embodiments, the method includes identifying that the monitored wireless traffic does not include a lossy transmission protocol.

In some embodiments, the method includes identifying a transmission boundary of the monitored wireless traffic. In some embodiments, the method includes identifying a pause in flow of the monitored wireless traffic. In some embodiments, the method includes identifying a closure of a connection at or above the network layer.

In some embodiments, the method includes identifying, responsive to closure of a connection at or below the link layer, that the number of wireless client devices is below a predetermined threshold. In some embodiments, the method includes estimating a lull time remaining. In some embodiments, the method includes determining lull time threshold based on the list of backup channels. In some embodiments, the method includes determining that the lull time is greater than the lull time threshold.

At least one aspect is directed to a system for scheduling dynamic frequency selection channel availability checks. In one aspect, the system may include a wireless access point comprising a network interface and a processor. The processor may be configured to monitor wireless traffic traversing the wireless access point from one or more wireless client devices, determine to perform an off-channel availability check, based on the monitored wireless traffic, and select a backup channel of a list of one or more backup channels. The processor may further be configured to scan the selected backup channel for radar for a predetermined time period, responsive to the determination.

In some embodiments, the system includes the processor further configured to identify that the monitored wireless traffic does not include an indication of priority above a predetermined threshold. In some embodiments, the system includes the processor further configured to identify that the monitored wireless traffic does not include a lossy transmission protocol.

In some embodiments, the system includes the processor further configured to identify a transmission boundary of the monitored wireless traffic. In some embodiments, the system includes the processor further configured to identify a pause in flow of the monitored wireless traffic. In some embodiments, the system includes the processor further configured to identify a closure of a connection at or above the network layer.

In some embodiments, the system includes the processor further configured to identify, responsive to closure of a connection at or below the link layer, that the number of wireless client devices is below a predetermined threshold. In some embodiments, the system includes the processor further configured to estimate a lull time remaining. In some embodiments, the system includes the processor further configured to determine a lull time threshold based on the list of backup channels. In some embodiments, the system includes the processor further configured to determine that the lull time is greater than the lull time threshold.

The details of various embodiments of the disclosure are set forth in the accompanying drawings and the description below.

BRIEF DESCRIPTION OF THE FIGURES

The foregoing and other objects, aspects, features, and advantages of this disclosure will become more apparent and better understood by referring to the following description taken in conjunction with the accompanying drawings, in which.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Various regulatory domains mandate that wireless devices must perform channel availability checks on regulated channels before starting operations on the channel to ensure that there are no radars operating on the channel. The duration of such mandated checks may be as much as ten minutes of no radar detected before the channel may be considered to be an available channel. If radar is detected, the channel is considered unavailable, and may remain so under the regulatory schemes for thirty minutes or more. When a device has detected an interfering signal such as a radar signal during operation, wireless service provided by the device will be interrupted for at least the minimum duration of the channel availability check, since the device has to find a new available channel. This may be unacceptable for mission-critical networks.

Accordingly, in one aspect of the systems and methods disclosed herein, a device may maintain a list of available channels. When a radar signal has been detected, the device may immediately switch to one of the channels identified as available to minimize service down-time. The list may be populated via pre-service scanning, in which the device performs CACs on all the usable channels; off-line scanning, in which the device performs CACs on one or more channels during a pre-designated out-of-service time period (e.g. late night); and/or via in-service scanning, in which the device performs frequent and short off-channel checks on usable channels during lulls in service on an active channel, with such lulls determined via various factors such as the number of active clients, traffic type, and traffic load.

Figure 2:
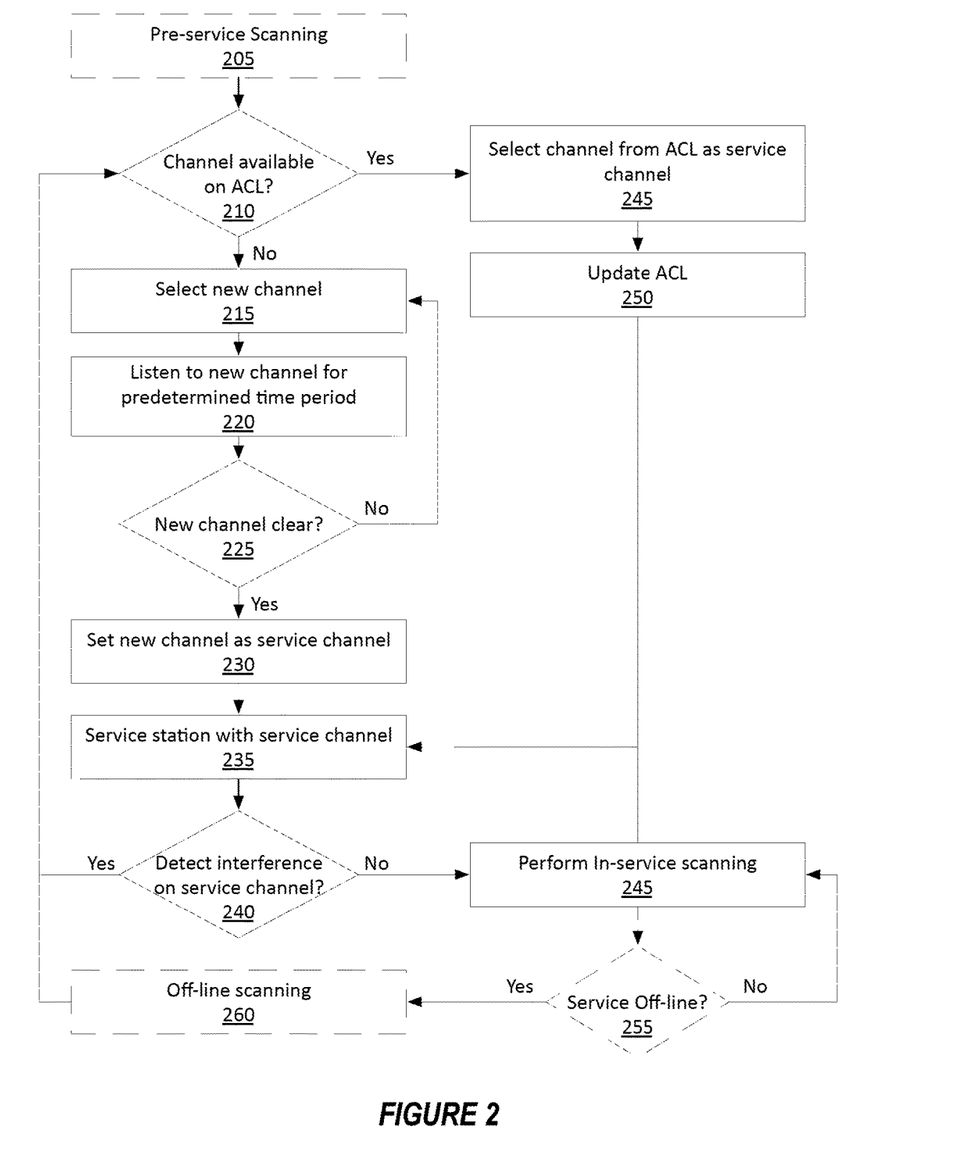
FIG. 2 is a flowchart of an embodiment of a method of fast channel switching.
Figure 3:
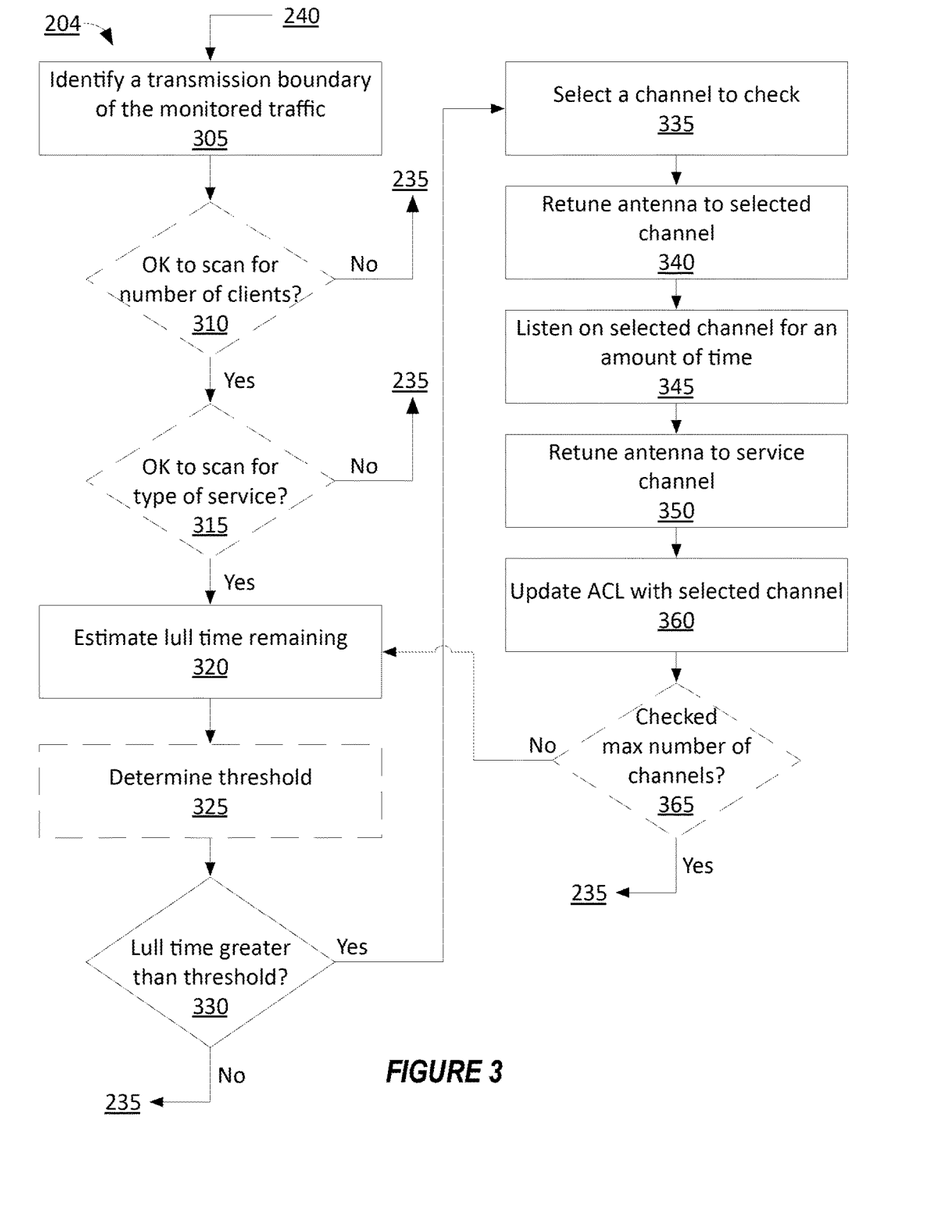
FIG. 3 is a flowchart of an embodiment of a method of performing in-service scanning.
Figure 4:
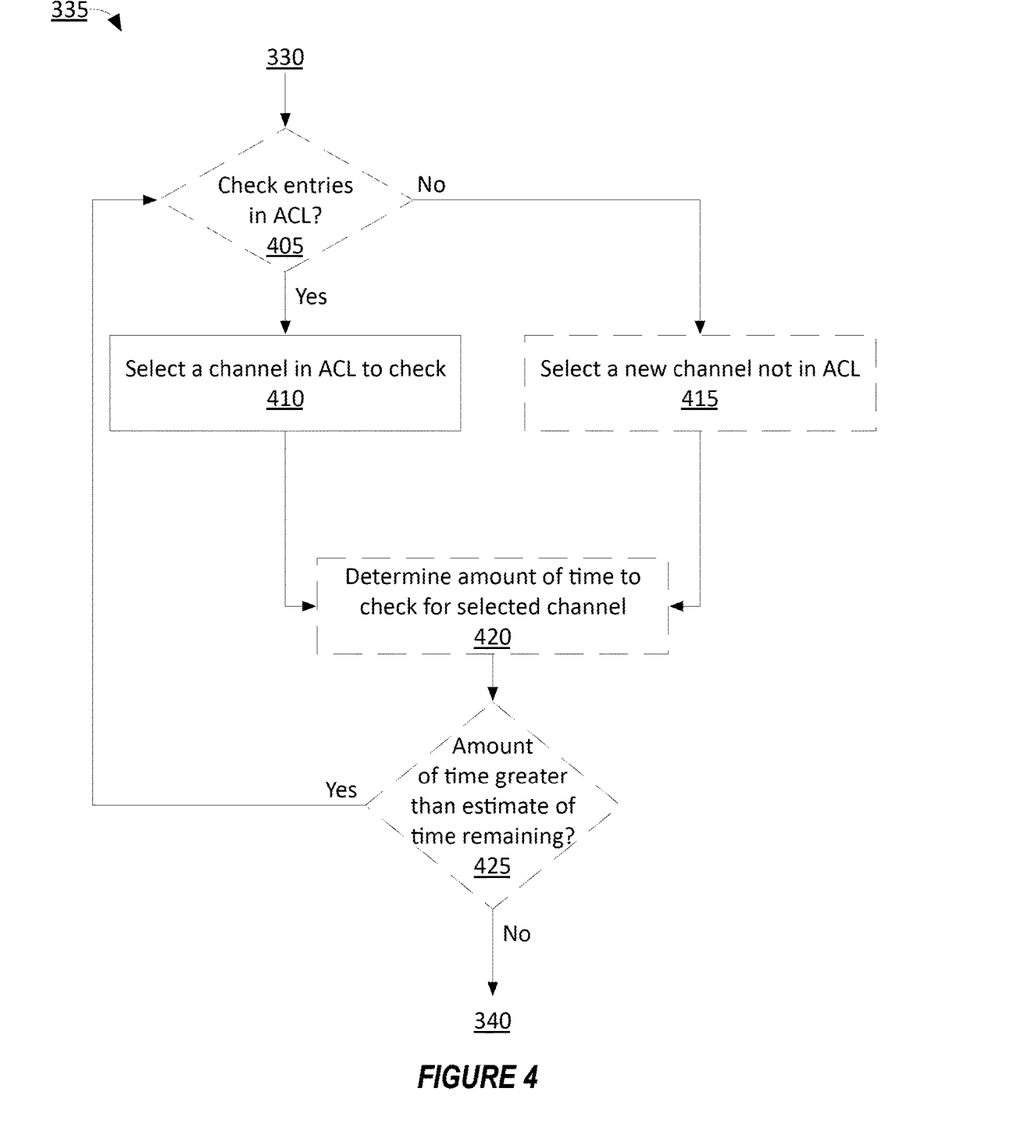
FIG. 4 is a flowchart of an embodiment of a method for selecting a channel to check during in-service scanning.
Figure 5:
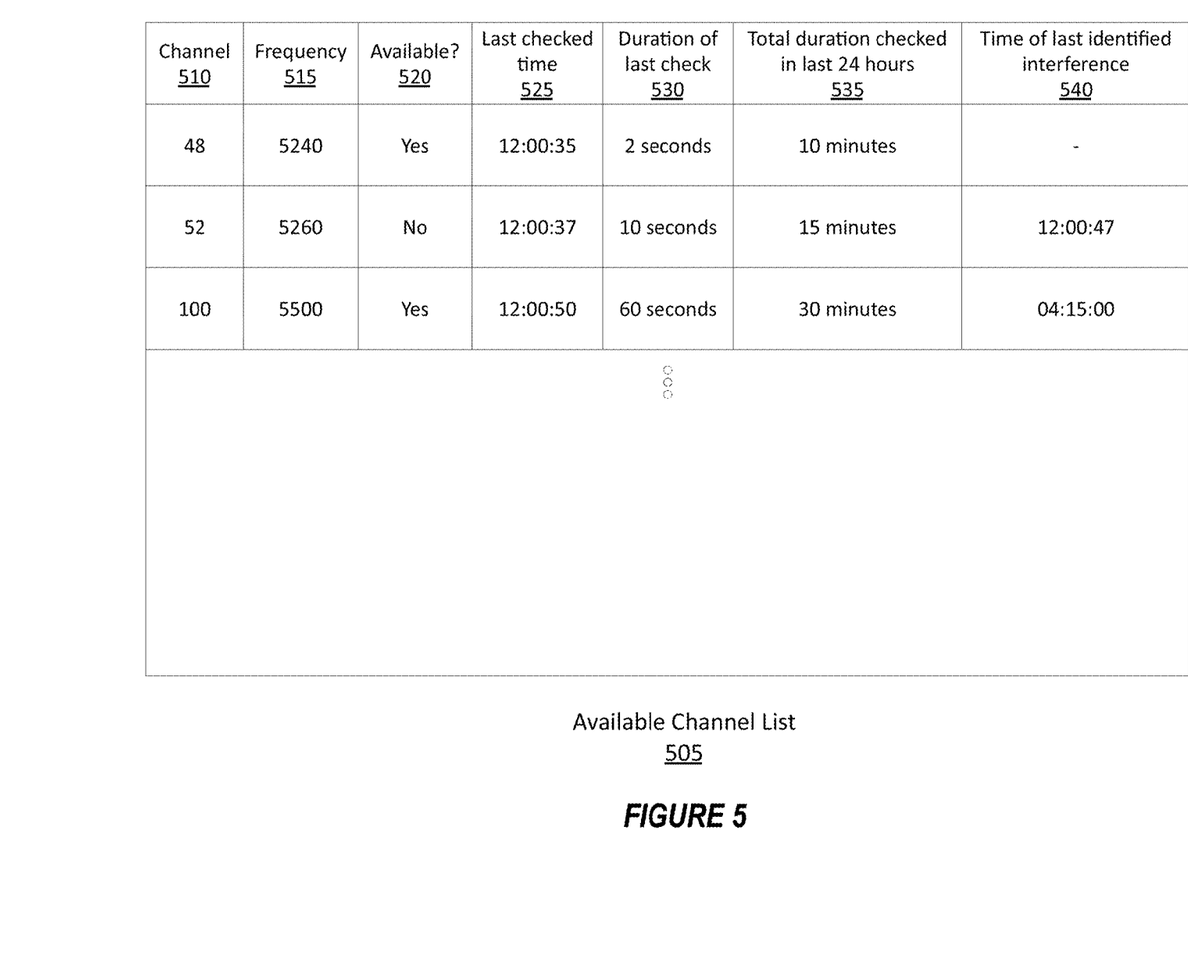
FIG. 5 is a table depicting an embodiment of an available channel list.

Now referring to FIGS. 1 through 4, various implementations of methods of channel switching for DFS schemes and populating and maintaining an available channel list (an example of which is illustrated at FIG. 5) will be discussed. Specifically, FIGS. 1 and 2 illustrate implementations of methods of channel switching and populating a list via pre-service and off-line scanning and FIGS. 3 and 4 illustrate implementations of in-service scanning that may be performed by devices such as those described in connection with FIG. 6.

Figure 1:
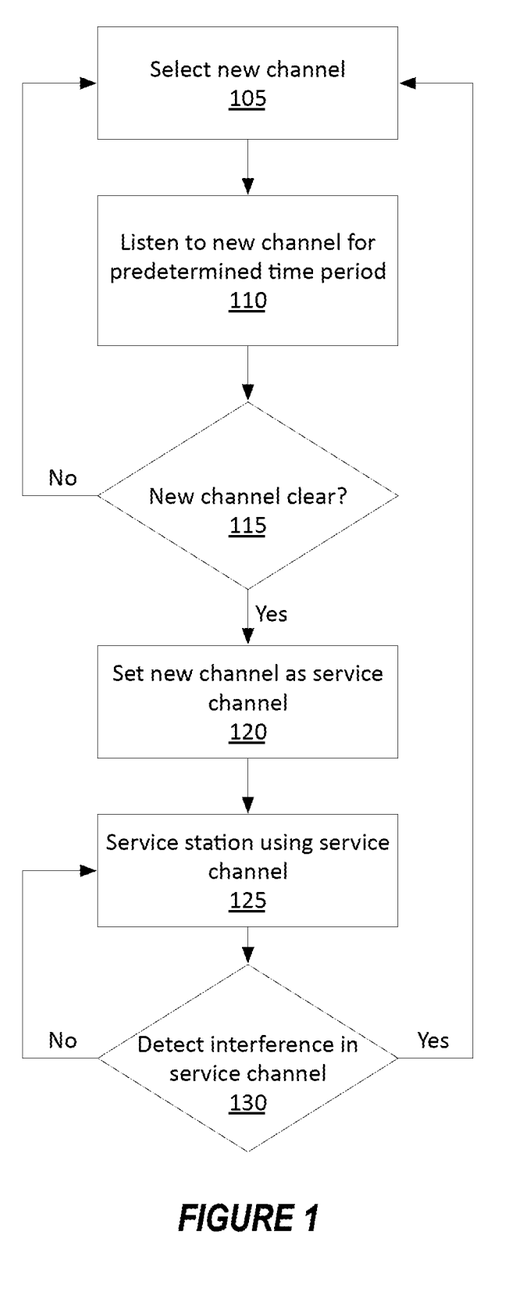
FIG. 1 is a flowchart of an embodiment of a method of channel switching.

FIG. 1 is a flowchart of an embodiment of a method of channel switching for DFS schemes, such as by any implementations of devices as described in connection with FIG. 6. In brief overview, the method includes a device selecting a new channel (step 105), listening to the new channel for a predetermined time period (step 110), and determining whether the new channel is clear of radar (step 115). If the new channel is not clear, then the device selects another channel (step 105). Otherwise, if the new channel is clear, the device sets the new channel as a service channel (step 120) and services a station using the service channel (step 125). If the device detects radar at the service channel (step 130), then the device selects another channel (step 105). Otherwise, the device continues to service the station at the service channel (step 125).

Still referring to FIG. 1, and in more detail, at step 105, a device selects a new channel. The channel may be a carrier frequency at which the device (e.g. a first device) may communicate with a second device. The first device may be an access point, a station, a client device, or any other wireless communication device. The second device may also be an access point, a station, a client device, or any other wireless device. In some embodiments, the first device is an access point, and the second client may be a client device. The first device may select a new channel from a list of predetermined channels within a specified band. The first device may select a first channel based on other clients services by the first device. In some embodiments, the selected new channel may be a regulated channel. If the selected new channel is not a regulated channel, in some implementations, the first device may use the selected new channel without listening to the new channel at step 110. In other implementations, the first device may monitor the unregulated channel to identify whether another device is using the channel, and may seek another channel that is not in use.

At step 110, the first device may listen to the new channel for a predetermined time period. The predetermined time period may be specified by an administrator and/or be stored in memory of the first device. The predetermined time period may depend on a frequency of the selected channel. For instance, some frequencies may not require any predetermined time period while other frequencies may require a predetermined time period of one minute, ten minutes, thirty minutes, or any other such time. In some embodiments, the first device may have a setting that determines which region the first device is operating in, and depending on the setting, use a different predetermined time period. The region-dependent predetermined time period may be stored in memory of the first device, either in the same table or as a different table. The region-dependent predetermined time period may be set according to the various regulations set by regulatory agencies, such as the FCC. In some embodiments, the selected new channel may be in a band where only part of the band may require monitoring.

At step 115, the first device may determine whether the new channel is clear. The new channel is clear if, for the duration of the predetermined time period, the first device did not detect any radar signal on the selected new channel. Steps 105-115 may be iteratively repeated until at least one available channel is detected.

At step 120, the first device may set the new channel as a service channel. In some embodiments, the first device may set the new channel as a service channel for one client device. In some embodiments, the service channel may be used for multiple client devices, such as via multi-casting, time domain multiplexing (TDM), or signal modulation. In some embodiments, the first device may store the service channel in memory with a client device identifier. In some embodiments, the service channel may be stored as a channel number or as a frequency number.

At step 125, the first device may service the second device (e.g. a station) using the service channel. The first device may transmit data packets to the second device over a communication channel specified by the service channel corresponding to a frequency. The first device may also receive data packets from the second device on the corresponding frequency or on a second, related frequency (e.g. in another sub-band or sub-channel in systems using frequency domain multiplexing). In some embodiments, the first device may transmit or receive over the channel that comprises a channel width, e.g. 40 MHz.

At step 130, the first device may detect interference in the service channel. In some embodiments, the first device detects a radar signal during a predetermined time slice, e.g. a five millisecond period. The duration of a predetermined time slice may be a setting stored in a memory element of the first device and may be region dependent. In some embodiments, the first device may be a half-duplex device and switch between transmitting and receiving. For instance, the first device may use a collision avoidance or a multiple access method to transmit and receive signals from one or multiple client devices. In some embodiments, the first device may be a full-duplex device with a plurality of antennas and thus it may be capable of both transmitting and receiving at the same time. The first device may detect a radar signal while transmitting a transmission to a second device.

When the first device detects a radar signal, the first device may stop any outgoing transmissions to the second device (e.g. one or more client devices). In some implementations, the first device may inform the second device to stop sending any transmissions over the service channel, while in others, the second device may independently detect the radar signal at the service channel and stop transmitting any transmission on the service channel to the first device. In some embodiments, the second device may inform the first device to stop transmitting at the service channel. In some embodiments, either the first device or the second device may inform the other device of a backup channel or frequency. In some embodiments, the device that detects the radar signal may broadcast to multiple devices a command to stop transmitting at the service channel. The first and the second device may stop sending additional transmissions over the service channel within a time constraint, such as within one second. For instance, the first device may stop any additional transmission within 1 second. In some embodiments where the first device is a half-duplex device, the first device may be capable of switching between transmitting and receiving at a time faster than required for the time constraint.

After detecting the radar signal and stopping any transmissions on the service channel, the first device may then proceed to select a new channel at step 105. The new channel may be different from the previous service channel on which radar signal was detected and transmissions were stopped.

If no radar signal was detected, then the first device may continue to service the second device using the service channel at step 125.

Although discussed herein primarily in terms of radar, other types of signals may be required to be interference-free by various regulatory schemes, such as emergency communications signals, navigation signals, military signals, or other such signals. Accordingly, the various systems and methods discussed above may be applied to detection and avoidance of any other such signals, referred to generally as "protected signals", without limitation.

In some embodiments, such other signals may be required to be protected or not protected based on an indication of priority, flag, or other indicator within the signal. In such embodiments, the first device may determine if the detected signal includes an indication of priority. The indication of priority may be included in the signal and may be over a predetermined priority threshold. For instance, the detected signal may be a radar used for Terminal Doppler Weather Radar (TDWR) system, and the detected signal may include an indication of high priority. In some embodiments, in steps 105-115 of FIG. 1, as soon as an interference is detected, the first device stops listening for additional signals for any time remaining on the predetermined time period. In a further embodiment, the device may stop listening after detecting an interference or another signal with a high priority indication.

Similarly, in some embodiments, the systems and methods discussed herein may be used to avoid causing interference to high priority or time sensitive communications using a lossy protocol. If the interference is using a lossy transmission protocol, the first device may infer that another device is transmitting time-sensitive data, such as data used for Voice-over-IP (VoIP) or video streaming. The first device may determine to not perform in-service scanning on the frequency where the interference is detected so as to not interfere with time-sensitive transmission of another device. Accordingly, in some embodiments, the first device may determine whether the interference is using a lossy transmission protocol. A transmission protocol may be a transport layer protocol, or may be at any other layer. The first device may determine that the interference is lossy by the type of protocol used or by channel characteristics of the interference, such as signal-to-noise ratio that is above a certain threshold. In some embodiments, the first device may determine whether the interference also has an indication of priority above a threshold, and may avoid using the channel accordingly.

FIG. 2 is a flowchart of an embodiment of a method of fast channel switching. In brief overview, the method may optionally include the first device performing pre-service scanning (step 205). The method further includes the first device determining whether a channel is available on the available channel list (ACL) (step 210). If there is a channel available, the first device may select a channel from the ACL as the service channel (step 245), update the ACL (step 250), and service the second device (e.g. the station) with the service channel (step 235). If a channel is not available on the ACL (step 210), then the first device may select a new channel that is not on the ACL (step 215). The first device may then listen to the new channel for a predetermined time period (step 220). If the new channel is clear (step 225), then the first device may set the new channel as the service channel (step 230) and service the second device (e.g. a station) with the service channel (step 235). If the first device detects a radar signal on the service channel (step 240), the first device goes back to determining whether a channel is available on the ACL (step 210). If there is no radar, then the first device may perform in-service scanning (step 245). In some embodiments, the first device may optionally determine whether the service is off-line (step 255), and if so, perform off-line scanning (step 260). When the service comes back on-line, the first device may go back to determine whether a channel is available on the ACL (step 210).

Still referring to FIG. 2 and in more detail, at step 205, the first device may optionally perform pre-service scanning. The pre-service scanning may comprise populating an ACL before starting a service for one or more second devices, such as on initialization or boot up of the first device. Populating the ACL may include scanning one or more channels, each for a predetermined period of time, and entering the results of the scan in the ACL. The first device may be configured to perform a specified number of scans. In some embodiments, the first device may have a plurality of antennas and tuners and check a plurality of channels simultaneously.

At step 210, the first device may determine whether a channel is available on the ACL. In some embodiments, the ACL may have been populated by pre-service scanning In some embodiments, the ACL may have been populated by in-service scanning or off-line scanning, discussed in more detail below. The ACL, as described in further detail in relation to FIG. 5, may include information as to whether a channel is available for use. A channel may be available if a number of conditions have been met such as whether the channel has been scanned for a predefined amount of time (e.g. ten minutes) and/or within a recent period of time (e.g. the past six hours).

At step 245, if a channel is available on the ACL, then the first device may select the available channel as a service channel. The first device may use the service channel to communicate with one or more second devices. The service channel may have a characteristic bandwidth, such as 40 MHz or 80 MHz, which may be communicated to the one or more second devices. In some embodiments, more than one channel may be available on the ACL, and the first device may select one of the available channels. The first device may select a channel based on one of different factors. For instance, the first device may select a channel that is found first in the ACL. In another instance, the first device may go through each of the channels in the ACL and select a channel that is available that has been scanned most recently. In another instance, the first device may select a channel that has been scanned the most in the previous twenty-four hours. In yet another instance, the first device may select a channel based a combination of when the channel was scanned and how long it was scanned for in the last twenty-four hours. In yet another instance, the first device may select a channel among the plurality of available channels, that has the most distant time (e.g. earliest time) of identified interference as compared to other available channels. In still another instance, the first device may select a channel among the plurality of available channels based on a lowest amount of noise on the channel, based on a fewest number of detectable other devices transmitting on the channel, or any other such basis.

At step 250, the first device may update the ACL. In some embodiments, the first device may delete the selected channel from the ACL. In some embodiments, the first device may mark the first channel as in-use in the ACL. In some embodiments, the first device may perform a quick scan of the selected channel to ensure that no interference is detected, and update the ACL according to the monitored result. The quick scan may last from, for instance, one millisecond to ten seconds. The quick scan may be performed as part of servicing the second device, as described in relation to step 235.

At step 215, if the first device did not find an available channel on the ACL, the first device may select a new channel. Selecting a new channel may be similar to step 105 as described in relation to FIG. 1. In some embodiments, the first device may select a channel that is not listed on the ACL. In some embodiments, the first device may select a channel listed in the ACL that is not available. In some embodiments, the first device may first look for a new channel not listed, then find a channel listed on the ACL that is not available. In other embodiments, the first device may first look for a channel listed on the ACL that is not available and then look for a channel not listed on the ACL. In some embodiments, when the first device is selecting a channel listed on the ACL that is not available, the first device may select from a plurality of channels listed on the ACL that is not available. In some embodiments, the first device may select a channel based on how long the channel was scanned; for instance, the first device may select a channel that has been scanned the most recently among the plurality of channels on the ACL that are unavailable. In another instance, the first device may select a channel among the plurality of unavailable channels in the ACL that has been scanned the most in the past twenty-four hours. In another instance, the first device may select a channel from the plurality of unavailable channels in the ACL that has been identified to have an interference at a most distant time (e.g. earliest time) compared to the other unavailable channels on the ACL. The selected new channel may be a regulated channel. If it is not a regulated channel, the first device may skip listening to the new channel at step 220 and set the new channel as service channel at step 230.

At step 220, the first device may listen to the new channel for a predetermined time period. Listening to the new channel may be similar to step 110 as described in relation to FIG. 1. In some embodiments, if the new channel was selected from a plurality of unavailable channels listed on the ACL, the first device may listen for a reduced time period calculated by taking the predetermined time period and subtracting a value taken from the ACL that indicates how long the new channel has been scanned recently, such as immediately prior to the new channel selection at pre-service scanning 205, in-service scanning 245, or off-line scanning 260. In some embodiments, listening to the new channel may be performed on a separate antenna. Upon detecting a radar within the predetermined period of time or within the reduced period of time, the first device may immediately move on to step 225.

At step 225, the first device may determine whether the new channel is clear, which may be similar to step 115 as described in relation to FIG. 1. The first device may determine whether the channel is clear when a radar is detected within the predetermined period of time, or within a reduced period of time.

If the interference is detected, the first device may go back to selecting a new channel 215 that is different from the channel where the interference was detected. In some embodiments, the first device may update or enter an entry into the ACL. The entry in the ACL may include information regarding how long and when the channel was scanned. The entry may also store an indication that the channel was unavailable and the time the interference was detected.

At step 230, if the new channel is clear, the first device may set the new channel as the service channel, similar to step 120 of FIG. 1. In some embodiments, the first device may update the ACL. For instance, if an entry existed previously in the ACL, that entry may be deleted. In another instance, the entry in the ACL may be updated to indicated that the channel is currently in-use, or an entry may be added to the ACL. Scan times may also be updated in the ACL for the entry corresponding to the service channel.

At step 235, the first device may service the second device (e.g. the station) with the service channel, similar to step 125 of FIG. 1. In some embodiments, a plurality of second devices may be serviced by the same service channel. In some embodiments, the first device and the second device may avoid collision by not transmitting at the same time, such as via a TDM or time-slicing scheme. Servicing a device may comprise establishing one or more connections with the device, including data link layer, network layer, transport layer, or any other layer connections; performing network address translation protocols, dynamic host configuration protocols, or any other such protocols for the device; transmitting requests and responses to and from the device; encrypting, buffering, compressing, or otherwise processing data transmitted to or from the device; and/or performing any other such functions.

At step 240, the first device may detect interference on the service channel, similar to step 130 of FIG. 1. In some embodiments, detecting interference on the service channel may be performed as part of determining whether to perform in-service scanning during step 245. In some embodiments, the second device may detect the interference.

In some embodiments, the first device may cease transmission of any data packet on the service channel within a time constraint. In some embodiments, the first device may inform the second device to stop transmitting on the service channel. Upon detection of the interference, the first device may update the ACL entry corresponding to the service channel, or add an entry in the ACL if none exists. The updated entry will include, for instance, information on the last indicated interference as well as an indication that the service channel is unavailable. If the interference is detected, then the first device may go back to step 210 and determine whether another channel is available on the ACL.

At step 245, if no interference is detected at step 240, the first device may perform in-service scanning In-service scanning may include scanning channels that are listed on the ACL and updating corresponding entries in the ACL. In some embodiments, in-service scanning may include scanning channels not listed on the ACL and add entries into the ACL. In some embodiments, the first device may have a plurality of antennas and check a plurality of channels simultaneously. The details of some implementations of in-service scanning are described in relation to FIG. 3. After performing in-service scanning, the first device may return to servicing a second device at step 235.

Optionally, at step 255, after performing in-service scanning, the first device may check whether the service is off-line. If the service is not off-line, then the first device may perform additional in-service scanning or return to servicing a station with the service channel at step 235. Service may be off-line during specific time of day (e.g. during late night) as defined by settings in the first device. For instance, service may be off-line between 3:00 AM to 3:10 AM every day. In some embodiments, the first device may learn via machine learning the days of the week and/or time of day when the first device is not used by at least one client. For instance, the first device may learn that the first device is not used between 9:00 AM to 8:00 PM on Monday to Friday. In other implementations, a service may be considered off-line when no other devices are connected to the first device (e.g. after a last device has closed a connection, or before any devices have connected to the first device). In some implementations, step 255 may be performed after step 240 or step 235, skipping in-service scanning at step 245.

Optionally, at step 260, after determining that the service is off-line, the first device may perform off-line scanning. The first device may perform channel availability check on one or more usable channels to create or update the ACL. Off-line scanning may comprise scanning a channel for a predefined period of time, e.g. one minute. In some embodiments, the first device may have a plurality of antennas and check a plurality of channels simultaneously. In some implementations, such as where a service is off-line during a predetermined time period (e.g. 3:00 AM to 3:10 AM), the device may perform as many CACs as possible during the predetermined time period, and return to step 210 (or step 235) at the end of the time period. In other implementations, such as where a service is considered off-line when no clients are connected to the device, the device may perform one or more CACs, such as in a short time period (e.g. 10-30 seconds), and return to step 235 for another short time period (e.g. 10-30 seconds). If no clients connect during this latter time period, then the device may return to step 260 and perform an additional one or more CACs for another short time period. This may allow servicing new clients with low latency, while constantly updating the available channel list when no clients require service.

FIG. 3 is a flowchart of an embodiment of a method for performing in-service scanning, as a part of an embodiment of fast channel switching as described above in connection with FIG. 2. In-service scanning may be used for scheduling dynamic frequency selection channel availability checks and may be referred to as performing off-channel availability checks or off-channel CACs. In brief overview, the method includes the first device identifying a transmission boundary of the monitored traffic (step 305). The method may optionally include the first device determining whether it is okay to scan for the first device to scan given a number of clients (e.g. second devices, or stations) that the first client is currently servicing (step 310). The method may optionally include the first device determining whether it is okay for the first device to scan for a type of service (or types of services) that the first device is providing to the second device (step 315). The method may include the first device estimating a lull time remaining (step 320). The method may optionally include the first device determining a threshold (step 325). The first device may determine whether the lull time remaining is greater than a threshold (step 330). If the lull time is greater than the threshold, the first device may select a channel to check (step 335). The first device may then return an antenna to the selected channel (step 340), listen on the selected channel for an amount of time (step 345), and return the antenna to the service channel (step 350). The first device may update the ACL with the selected channel (step 360). Optionally, the first device may check whether a maximum number of channels has been checked (step 365). If less than a maximum has been checked, the first device may re-estimate the lull time remaining (step 320). After in-service scanning, the first device may return to servicing the second device, as indicated by step 235 of FIG. 2.

Still referring to FIG. 3, and in greater detail, at step 305, the first device may identify a transaction or transmission boundary of the monitored traffic. In some embodiments, the first device may be a wireless access point that may monitor wireless traffic traversing the wireless access point from one or more wireless client devices. The transmission boundary may be a pause or termination of a transmission, transaction, or data flow, and may be identified via an explicit boundary or an implicit boundary. Transmission boundaries may be identified at any layer of the communication. In some embodiments, the transmission boundary may be identified at the link layer, internet layer, transport layer, or the application layer of the Open System Interface (OSI) model. In some instances, the transmission boundary may be identified at the transport control protocol (TCP), such as based on one or more flags found in the header of a TCP packet. In some instances, the transmission boundary may be identified at multiple layers, particularly with implicit transmission boundaries.

In some embodiments, an explicit boundary may include a packet from the second device explicitly indicating a termination of a connection between the first device and the second device. For instance, when the devices are using TCP, a FIN packet may be sent from the second device to the first device or from the first device to the second device. In some instances, a four-way handshake or a three-way handshake may follow a FIN packet.

In some embodiments, an implicit boundary may be inferred. In some instances, the first device may receive from the second device, a packet with a PSH bit or flag set. The PSH bit may indicate that the second device may not have additional packet to send to the first device, and that the sent packet should not be buffered. The first device may implicitly recognize that the second device may not send any immediate packets to the first device, thus identifying a boundary. In some embodiments, after receiving the packet with the PSH bit, the first device may identify a type of application that is sending the packet from the second device or a type of application that will receive the packet. In some instances, the first device may recognize the type of application layer packets. The application layer may include time-sensitive data, such as data used for Voice-over-IP (VoIP) or video streams. The first device may recognize that the application layer packets may include time-sensitive data, and thus determine that there will not be a boundary in the transmission. In some instances, the application layer packet will indicate a termination or an end of a content, such as an end of a video or an end of a VoIP call. In such instances, the first device may infer an implicit boundary in the transmission. In some instances, the application layer may be non-time-sensitive, such as email or an hypertext markup language (HTML) file. In such instances, the first device may identify an implicit boundary after an email has been loaded or after resources for a HTML file has been transmitted. In some embodiments, the PSH bit may be set for a last packet of data file sent from one device to another to prevent buffer deadlock. The first device may implicitly infer that when receiving from a second device a packet a PSH bit set, that the packet will be a last packet from the second device for a data file.

In some instances, the first device may send or receive a packet with a reset (RST) bit or flag set. When the RST bit is set in a data packet, the device sending the data packet is indicating that no further data should be sent to the device. The first device may infer that if it receives or sends a data packet with a RST bit set, then the communication between the devices has been terminated. The first device may infer a transmission boundary from the RST bit.

In some embodiments, identifying a transmission boundary comprises identifying a pause in flow of the monitored wireless traffic. For instance, the first device may determine that for a first period of time, a second device has constantly received data packets. However, after the first period of time, the second device may stop receiving data packets. This can be detected via TCP header flags or via application layer packets. In some instances, the first device may determine that the second device has received all the data packets for a media file (such as a video or an audio file) and that no request for another file has been sent from the second device. For example, in one such embodiment, the first device may identify an implicit transmission boundary based on receiving a packet of less than a maximum transmission unit after receiving a series of packets equal to the maximum transmission unit, indicating that a fragmented data transfer is likely complete. In some instances, a request pattern of the second device may indicate that a web page has been fully loaded on the second device.

In some embodiments, identifying the transmission boundary comprises identifying a closure of a connection at or above the network layer. For instance, the transmission boundary may be identified at the network layer, transport layer, session layer, presentation layer, or the application layer. For instance, a data packet at the session layer may include a termination flag or a termination message. In another instance, the application layer may indicate that an application receiving or sending the data packet will terminate or will not be sending or receiving data packets for a fixed amount of time.

At step 310, the first device may determine whether it is okay for the first device to perform in-service scanning given the number of clients it is currently servicing. The first device may determine to perform an off-channel availability check that comprises identifying, responsive to a closure of a connection, that the number of wireless client devices is below a predetermined threshold. In some embodiments, the first device may identify a closure of a connection at or below the link layer, e.g. at the link layer or the physical layer. In other embodiments, the first device may identify a closure of a connection at any layer above the link layer. In some embodiments, the first device may keep track of connections that have been made to one or more client devices. The first device may store, for instance, the media access control (MAC) address of each client device. In response to identifying a closure of a connection, the first device may identify a number of client devices that the first device is still servicing. In some instances, the first device may be servicing a plurality of client devices on a single channel, and after one of the client devices closes a connection, the first device may still be servicing a number of remaining client devices. The first device may compare the number of remaining client devices and compare the number to a predetermined threshold. In some instances, the remaining client devices may be wireless devices. In some instances, some of the remaining client devices may be wireless devices while others are connected via a wired connection. In some instances, the first client may count the number of wireless client devices and not the wired client devices. The predetermined threshold for the number of wireless devices may be specified by a setting in the first device.

At step 315, the first device may determine whether it is okay for it to perform in-service scanning given the type of service or services it is providing. In some embodiments, the first device may identify that it is providing at least one real-time service such as VoIP or live streaming video or audio. In some embodiments, the first device may identify that the monitored wireless traffic does not include an indication of priority above a predetermined threshold. For indication, the traffic may indicate, via an urgent flag in the TCP, that the data packet needs to be delivered. In some embodiments, the first device may prioritize a specified port (e.g. a TCP port) or a range of ports, traffic from a specified device via a MAC or an IP address, or certain protocols. Priority may be indicated by other quality-of-service measures in the first device or other traffic-shaping or packet prioritization schemes. If the priority of the wireless traffic is above a specified threshold, the first device may not perform in-service scanning In some embodiments, the first device may additionally identify whether the wireless traffic includes a lossy transmission protocol. Use of a lossy protocol may indicate that the wireless traffic includes streaming video or audio or VoIP data packets. If the wireless traffic does include a lossy transmission protocol, the first device may not perform in-service scanning.

At step 320, the first device may estimate a lull time remaining. In some embodiments, the lull time may be based on an average interval of communication. The average interval of a communication may be a measurement of time between each data packet that is sent or received between the first device and the second device. For instance, the average interval of communication between the devices may be one minute; the second device may be loading a web page or an email application and may only need to request additional data on an average of once per minute. In some instances, if the communication comprises a single file that, due to its size, requires multiple data packets over a course of extended amount of time (e.g. between five seconds and up), then the average interval may be zero or close to zero as the second device will constantly be receiving data packets of that single file. In still other instances, the second device may transmit information at a periodic rate (e.g. from a smart device such as a smart thermostat or other such device), such that the average interval is very slow and reliable.

In some embodiments, the average interval may account for a most current set of traffic, the most current set comprising last specified number of data packets or last number of bytes transmitted or received. For instance, the average interval may account for each subsequent intervals between the last five data packets, ten data packets, or any other such number. The specified number of data packets may be from two packets to one hundred packets or more. In some embodiments, the most current set of traffic may comprise traffic bounded by time. For instance, the average interval may be computed based on all traffic received or sent within the last five seconds, ten seconds, thirty seconds, or any other such value. The time bound may be, for instance, between one second to ten minutes or more.

In some embodiments, the average interval may be calculated with a bias factor towards the most recent traffic. For instance, if the average interval is calculated using three intervals, the most recent interval may be multiplied by a factor of 0.5, the second most recent interval may be multiplied by a factor of 0.3, and the last interval may be multiplied by a factor of 0.2. The sum of the products may be used as the average interval. Any other schemes or equations may be used to favor the most recent interval in average interval calculation. In some embodiments, the average interval may be calculated with a bias factor based on time. For instance, if there are three intervals and the first interval was one second ago, the second interval was three seconds ago, and the third interval was ten seconds ago, then the first interval may be multiplied by a factor of one over two, the second interval multiplied by a factor of one or four, and the third interval may be multiplied by one over eleven. The sum of the products may be used as the average interval. Any other schemes or equations may be used to favor the most recent interval in average interval calculation based on time.

The first device may estimate a lull time based on the calculated average interval. In some embodiments, the lull time is set to the average interval. In some embodiments, the average interval is multiplied by a factor and then it is set as the lull time. The factor may be, for instance, 0.5 to 1.5. The factor may be specified by the first device. A factor less than one may indicate a conservative in-service scanning such as to minimize any potential impact of in-service scanning on the monitored wireless traffic. A factor greater than one may indicate an aggressive in-service scanning. For example, if the average interval is five seconds and the factor is one, the lull time will be five seconds. If the factor is 0.8, the lull time will be four seconds.

In some embodiments, estimating the lull time remaining may comprise updating a lull time estimate. If the lull time has previously been estimated and the first device has performed at least one in-service scanning during the lull time, then estimating the lull time may comprise subtracting the time elapsed since the time the lull time was first estimated. For instance, the first device may have first estimated the lull time as ten seconds. The first device may have then scanned a channel during steps 330 to 350 of the method of FIG. 3. After scanning, the first device may update the remaining lull time by subtracting the initial estimate by the time it took to scan the channel. In some embodiments, the time it takes to perform the steps 330 to 365 may be estimated and subtracted from the estimated lull time.

At step 325, the first device will determine a threshold, also referred to as lull time threshold. The estimated lull time must be greater than the determined threshold for the first device to proceed to in-service scanning In some embodiments, the threshold may be specified as an option on the first device. The threshold may be set as a value of time between a micro second to ten minutes or more. In some embodiments, the threshold may be determined by the ACL; each entry in the ACL may comprise an indication of how long the corresponding channel should be scanned. The minimum of this value among all the entries may be used as the threshold. In some embodiments, the threshold may be based on when the last scanning was performed. For instance, if the last scan was performed one second ago, the threshold may be a low value, e.g. 0.1 seconds. In some instances, the threshold may be set to time elapsed since the last scan or to a factor multiplied by the time elapsed. The factor may be between, e.g., 0.1 and 2.0. In some embodiments, the threshold may be determined based on the number of clients of the first device. Higher number of clients may indicate that a lower threshold should be used. In some embodiments, the threshold may be a predetermined amount of scan time plus the amount of time required to perform the steps 330 to 365 of the method of FIG. 3. In some embodiments, the threshold may be determined based on the estimated lull time or the initial estimated lull time. For instance, the threshold may be set to the estimated lull time multiplied by a factor between 0.1 and 2.0. If, for example, the estimated lull time is ten seconds and the factor is 0.5, then the determined threshold will be five seconds.

At step 330, the first device may determine whether the lull time is greater than the threshold. If the lull time is less than the threshold, the first device does not perform in-service scanning and may return to servicing the client devices at step 235 of FIG. 2. If the lull time is greater than the threshold, the first device proceeds to perform in-service scanning.

At step 335, the first device selects a channel to check. The first device may select a channel based on the estimated lull time remaining and/or the threshold. The selected channel may be a regulated channel. Details of the selecting a channel is described in relation to FIG. 4.

At step 340, the first device retunes an antenna to the selected channel. The antenna may be part of or is attached to the first device. The first device may set any options necessary for listening on the selected channel. For instance, the antenna and any associated turners and amplifiers may operate at a specified frequency channel and/or a specified band of frequency channel. In some embodiments, the first device may comprise multiple antennas, and the first device may tune one of the antennas for listening to the select channel. In some embodiments, the first device may include a dedicated antenna for listening to the selected channel.

At step 345, the first device may listen on the selected channel for an amount of time. The amount of time may be predetermined and specified on the first device. The amount of time may be based on the threshold value used in step 330. In some embodiments, the amount of time may be based on the lull time estimate. For instance, if the lull time estimate was five seconds, the amount of time may be 4.9 seconds. In some embodiments, the amount of time may be based on length of previous scan time for the channel, the time of the previous scan for the channel, or the time of last identified interference. For instance, the length of the previous scan time may be inversely proportional to the amount of time to scan. If the last scan was ten seconds, the current scan may be shorter, e.g. one second. In some embodiments, if the first device detects an interference before the expiration of the amount of time, the first device may stop listening and proceed to step 350.

At step 350, the first device may return the antenna to the service channel. The first device may set any other options that were changed in step 340, such that a client device may be serviced again. For embodiments that include multiple antennas, the first device may retune only the antenna that has been tuned to the selected channel. For embodiments with a dedicated antenna for listening to selected channels, the dedicated antenna may not need to be retuned, or it may be re-tuned to a default channel or frequency.

At step 360, the first device updates the ACL with the selected channel. If an entry exists in the ACL that corresponds to the scanned channel, that entry may be updated. If no entry exists in the ACL that corresponds to the scanned channel, a new entry may be added to the ACL. The entry may be added or updated with indications of whether an interference was detected, the time of the interference, the time of the scan, length of the scan, etc. Details of the ACL are described in relation to FIG. 5.

At step 365, the first device optionally determines whether the first device has checked a maximum number of channels during in-service scanning. In some embodiments, the first device may limit the number of channels it will scan during each lull time period. For instance, the maximum number may be three, in that the first device will scan up to three channels during a lull period. In some embodiments, the maximum number may be from one to fifty or more. In some embodiments where the first device does not check a maximum number of channels, the first device may return to servicing the client device at step 235 or to estimating a lull time remaining at step 320. As shown, in many implementations, steps 320-365 may be iteratively repeated to conduct multiple CACs on different channels, for as long as lull time remains. For example, if a lull time is estimated at ten seconds, and each channel only takes one second to tune to and listen on, ten channels may be listened to. Although such periods are shorter than may be required by a regulatory scheme to identify a channel as available, in the aggregate, multiple CACs on a channel may provide sufficient time to meet the regulatory requirements. For example, if a regulatory system requires 10 minutes of listening in a twenty-four hour period to identify a channel as available, and the device can perform five second in-service CACs, and if one hundred twenty such in-service CACs may be performed within the twenty-four hour period, the aggregate time will equal ten minutes, and may be sufficient for the regulatory scheme. Because such in-service CACs are responsive to lulls in communications of clients, they may be at random intervals, and accordingly, are not likely to miss periodic interference (e.g. short radar bursts every 30 seconds) for more than a few CACs.

FIG. 4 is a flowchart of an embodiment of a method for selecting a channel to check during in-service scanning In brief overview, the first device may determine whether to check entries in the ACL (step 405). If there are entries in the ACL to check, the first device may select a channel in the ACL. If there are no entries in the ACL to check, the first device selects a new channel not in ACL (step 415). The first device may then determine an amount of time to check for the selected channel (step 420), and determine whether the amount of time is greater than an estimate of time remaining (step 425). If the amount of time is greater, then the first device looks for another channel to check. Otherwise, the device proceeds to scanning the selected channel.

Still referring to FIG. 4, and in more detail, at step 405, the first device may optionally check entries in the ACL. The ACL may be prepopulated with one or more channels. In some embodiments, the channels in ACL are regulated channels. In some embodiments, the ACL may be prepopulated with all regulated channels. In some embodiments, the ACL may be empty and will be populated over time. In some embodiments, the first device may go through the ACL, and find at least one entry that has not already been checked in the present lull period. The lull period is described in relation to FIG. 3. For instance, the first device may at first select the first entry of the ACL. The first device may check the corresponding channel and select another channel to scan, which may be found in the second entry. The second entry may not be suitable to be scanned, and instead, the third entry may be selected. The order in which the ACL entries are examined may be sequential or determined by a hash function or a pseudo-random function. Some entries in the ACL may be unavailable for scanning due to time of the last interference. For instance, a regulation may require that a channel may not be used for thirty minutes after an interference.

At step 410, the first device may select a channel in the ACL to check. In some embodiments, the first device may select one channel from a plurality of available channels. The first device may select a next entry that has not yet been checked in the present lull period. In some embodiments, the first device may select a random channel to check. In some embodiments, the first device may maintain a priority queue. The priority queue may indicate the order in which the entries are to be checked. In some embodiments, the order may be determined by the sequence of the ACL entries, by a hash function or a pseudo-random function. In some embodiments, the first device may select the entry corresponding to a channel that has a highest likelihood of availability. For instance, a regulation may require that a channel is scanned for sixty seconds before use. One of the channels may have been already checked for a total of forty-five seconds in the last minute. The first device may select that channel because it has almost fulfilled the regulatory requirement. In some embodiments, the first device may choose not to select a channel in the ACL based on a corresponding time of last interference. In other embodiments, the first device may select an adjacent channel to a currently tuned-to channel, as this may be faster for retuning an antenna.

At step 415, the first device may select a new channel that is not in the ACL if there are no entries in the ACL to scan at step 405. In some embodiments, the ACL is not prepopulated with all regulated channels. In some embodiments, entries in the ACL may be deleted and thus a regulated channel may not be in the ACL. In some embodiments, the ACL may only store channels that are available. In some embodiments, the first device may select a new channel based on a pseudo-random number, hash function, or sequentially from the highest (or lowest) channel in the ACL. In some embodiments, the first device may select a new channel based on bands on channels in the ACL. For instance, the ACL may list channels in the range of 5260 MHz to 5580 MHz. The first device may select a channel in the range of 5660 MHz to 5825 MHz.

At step 420, the first device may determine the amount of time to check for the selected channel. The determined amount of time may be used at step 345 of embodiments of the method of FIG. 3. Determining the amount of time may be optional as a default value may be used. The amount of time may be based on the threshold value, lull time estimate, or any values from the corresponding ACL entry.

At step 425, the first device may determine whether the amount of time is greater than the estimate of time remaining. The estimate may be made in step 320 of embodiments of the method of FIG. 3. Because the amount of time may be based on values of the corresponding ACL entry, different channels may have a different value for the amount of time to scan that channel. Therefore, if the selected channel needs to be scanned longer than the estimate of time remaining, the first device may select another channel to scan. If the selected channel can be scanned within the time remaining, then the first device continues to step 340 as discussed above in connection with FIG. 3.

FIG. 5 is a table depicting an embodiment of an available channel list (ACL). The ACL may also be referred to as a list of backup channels. The ACL may be stored in the memory of the first device, and may be stored as a database, data array, flat file, XML file, or any other type and form of data. In some embodiments, the ACL may store the channels that are regulated. In some embodiments, the ACL may store any channels that are available for communication. In some embodiments, the ACL may store regulated channels that are not available but may become available based on scanning results.

The ACL may comprise entries of channels. Each entry may store channel 510 and/or frequency 515 information. A channel may correspond to the frequency, or may identify a sub-band or frequency offset of a channel. In some embodiments, the first device may be capable of communicating in multiple frequency bands. For instance, the first device may communicate via the 2.4 GHz or the 5 GHz frequency bands and the ACL may store both the channel number and the frequency or frequency offset. In some embodiments, the entry may further store an indication of channel width, e.g. 20 MHz, 40 MHz, 80 MHz or 160 MHz. In some embodiments, the ACL may store entries in an order of channels or equivalently, an order of frequencies.

An entry of the ACL may further comprise an indication of whether the corresponding channel is available 520. The availability may be stored as a bit or a flag. In some embodiments, the availability of the corresponding channel may be inferred from one or more of other fields in the entry (e.g. a time of last identified interference 540 being blank or greater than twenty-four hours previously), or from the presence of the entry in the ACL in implementations in which unavailable channels are removed from the ACL. In some embodiments, the availability may be updated every time a scan of the corresponding channel is completed. In some embodiments, the availability may be updated whenever a field in the entry is changed. In some embodiments, the availability field may be associated with a time out value, such that after the expiration of the time out value, the corresponding channel is no longer available and the entry is set as not available.

An entry of ACL may further comprise last time the channel was checked 525. The time may be stored in any format and resolution. For instance, the time format may be hour, minute, seconds. The time format may further include milliseconds or microseconds. Another time format may be, for instance, week number of a year and seconds number of the week. The last checked time may indicate the time the channel was last scanned, or the time the scan was last started. In some instances, the last checked time may be unset if the channel had not yet been scanned. In some embodiments, the channel may have been scanned during pre-service scanning, in-service scanning, or off-line scanning.

An entry of ACL may further comprise a duration of the last check 530. If the channel was scanned previously, then this field may store how long it was last scanned. In some embodiments, the channel may have not been previously scanned and thus this field may be empty.

An entry of ACL may further comprise a total duration that the channel was checked in the last twenty-four hours 535. Different durations of time may be used for this field. In some embodiments, this field may indicate a total duration that the channel was scanned in the last twelve hours. In some embodiments, this field may indicate a total duration that the channel was scanned in the last specified time period, where the specified number may be between thirty seconds to two days or more. The specified number may depend on or are based on regulations. In some embodiments, this field of every entry in ACL may be reset at a specific time. The reset time may occur once a day, twice a day, once every two days, etc.

An entry of ACL may further comprise a time of last identified interference 540. In some instances, the last interference may have been detected during pre-service scanning, in-service scanning, or off-line scanning In some instances, the last interference may have been detected during listening for a new channel at step 110 or step 220 as discussed above in connection with FIGS. 1 and 2. In some embodiments, the last identified interference field 540 may be associated with a timeout period, after which this field is reset. For instance, after the field 540 is set, it may be reset after thirty minutes. The reset timeout period may be between one minute to two days or more, based on regulations. In some embodiments, the field 540 may be reset when the first device is off-line. In some embodiments, the field 540 may be reset when the channel becomes available.

As illustrated in FIG. 5, an example entry in the ACL may be for channel 48, which may correspond to frequency 5240 MHz. The channel may be available based on the scans, and the last time it was checked may be 12:00:35, expressing time in hours, minutes, and seconds. The channel may have been scanned for two seconds, and the channel may have been scanned for a total of ten minutes in the last twenty-four hours. There may not have been a detected interference on this channel.

Figure 6:
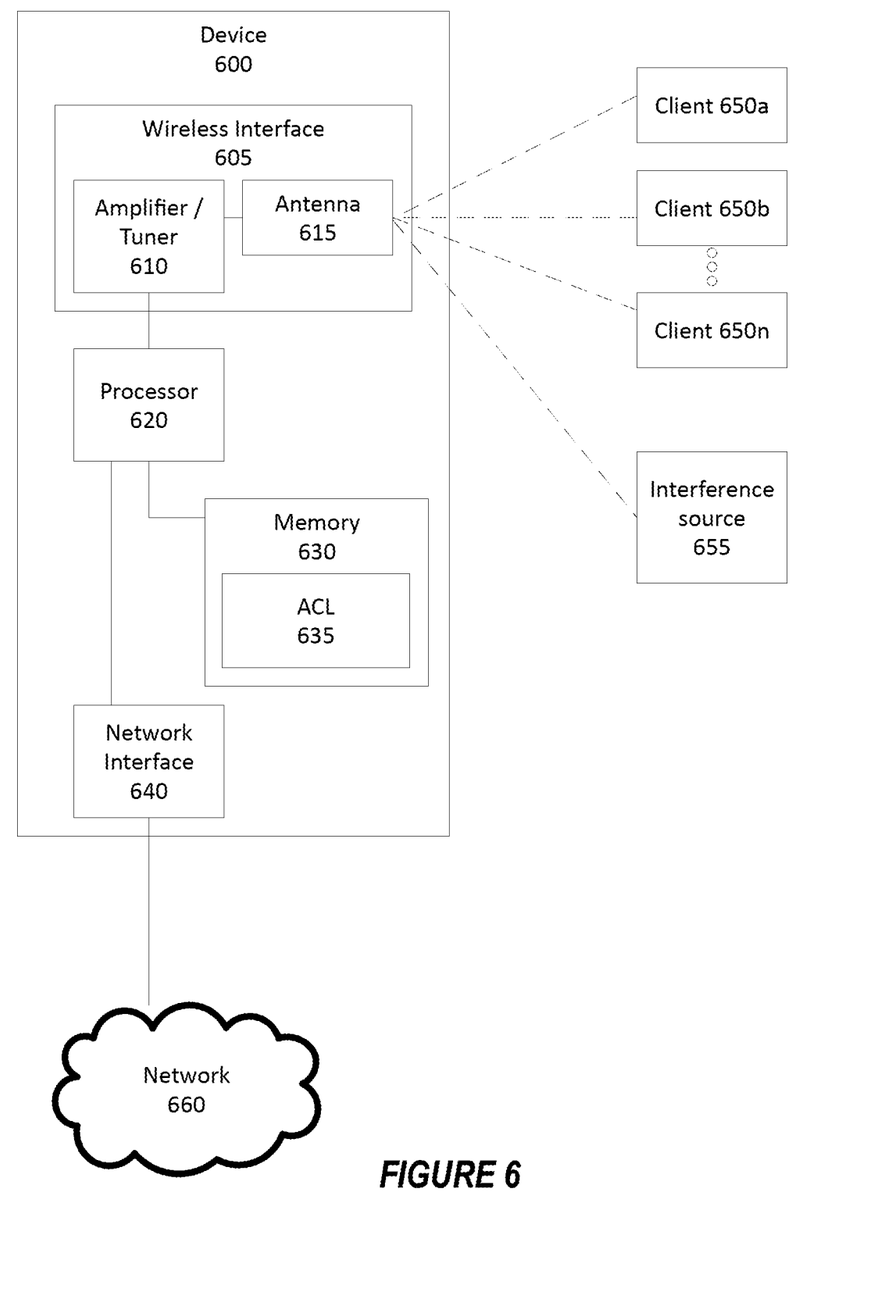
FIG. 6 is a block diagram of an embodiment of a system for fast channel switching.

FIG. 6 is a block diagram of an embodiment of a system for fast channel switching. In brief overview, the system may comprise a device 600 in communication with one or more clients 650a-650n (generally referred to as client(s) 650), one or more interference sources 655, and one or more networks 660. The device may comprise one or more wireless interfaces 605, processors 620, memory 630, and network interfaces 640. The wireless interface(s) 605 may each comprise an amplifier 610 and an antenna 615, or may share one or more components. The memory 630 may comprise an ACL 635.

Still referring to FIG. 6, the device 600 may be an access point, such as a wireless access point. The device 600 may be a router, a wireless router, or a master device. In some embodiments, the device 600 may be any type and form of computing device. A client 650 may be a client device, such as a laptop, tablet computer, smart phone, wearable computing device, or other such device; a station; or another access point. The device 600 and clients 650 may be deployed as and/or executed on any type and form of computing device, such as a computer, network device or appliance capable of communicating on any type and form of network and performing the operations described herein. The device 600 may implement the set of networking standards specified by IEEE 802.11, as well as any other type and form of wireless or wired communications.

An interference source 655 may be a computing device, similar to the device 600, or may be a radar transmitter or other electromagnetic source. The interference source may be, for instance, terminal Doppler weather radar (TDWR). The interference source may be a military radar or any other type of interference source. The interference source may broadcast, transmit, or emit a signal at a frequency that is regulated by an agency such as the Federal Communications Commission (FCC) or other regulatory agency or governing body. The interference signal may carry an indication of priority.

The wireless interface(s) 605 may comprise one or more amplifiers 610 and antennas 615. The wireless interface 605 may be a network interface. The amplifier 610, which may include or work with a tuner, may tune the antenna 615 to a selected channel. The antenna 615 may be capable of receiving and transmitting wireless signals of selected frequencies. In some embodiments, the wireless interface 605 may utilize a plurality of antennas and amplifiers, for multiple-input and multiple-output wireless communication. In some embodiments with a plurality of antennas and amplifiers, each antenna may be tuned independently to other antennas. In some embodiments, one of a plurality of antennas may be dedicated to listening for interference from interference sources 655. In some embodiments, the antenna 615 may be tuned to a particular channel. In some embodiments, the antenna 615 may communicate at frequencies of 2.4 GHz, 3.6 GHz, 4.9 GHz, 5 GHz, 5.9 GHz, 60 GHz, or 900 MHz. In some embodiments, the antenna 615 may communicate at a specified channel bandwidths, for instance, at 20 MHz, 40 MHz, 80 MHz, or 160 MHz. In some embodiments, the antenna 615 may be used to allow channel bonding. In some embodiments, the antenna 615 may be used for beamforming or spatial filtering. The wireless interface 605 may be configured to monitor wireless traffic traversing the connections with clients 650 and the interference source 655.

The processor 620 is any logic circuitry that responds to and processes instructions fetched from the main memory unit 630. The processor 620 may also be referred to as central processing unit (CPU). The processor 620 may be a microcontroller, a microprocessor, or a digital signal processor core. In some embodiments, the processor 620 comprises multiple cores. In some embodiments, the device 600 may comprise a plurality of processor 620. In some embodiments, the processors may be part of a chipset. In some embodiments, the processor may be a multiple bit processor, such as a 16-bit, 32-bit, or a 64-bit processor. In some embodiments, the processor may be of a specific architecture, such as a Microprocessor without Interlocked Pipeline Stages (MIPS) architecture, x86 architecture, or an ARM architecture. In some embodiments, the processor 620 may be part of a system-on-a-chip (SoC). In some embodiments, the device 600 may further include a graphical processing unit (GPU).

In some embodiments, the processor 620 may communicate with or include cache memory. The processor 620 may communicate directly with cache memory via a secondary bus, sometimes referred to as a backside bus. In other embodiments, the processor 620 communicates with cache memory using a system bus. Cache memory typically has a faster response time than main memory 630 and is typically provided by SRAM, BSRAM, or EDRAM. The processor 620 may communicate with the wireless interface 605, and the network interface 640 via a local system bus, which may be a VESA VL bus, an ISA bus, an EISA bus, a Micro-Channel Architecture (MCA) bus, a PCI bus, a PCI-X bus, a PCI-Express bus, or a NuBus. In some embodiments, the processor 620 may use an Advanced Graphics Port (AGP) to communicate with a display. In some embodiments, the processor 620 may communicate with the wireless interface 605, and/or the network interface 640 via HyperTransport, Rapid I/O, or InfiniBand.

Main memory unit 630 may be one or more memory chips capable of storing data and allowing any storage location to be directly accessed by the microprocessor 620, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). In some embodiments, the memory 630 may comprise a content-addressable memory (CAM) or a ternary content-addressable memory (TCAM). The main memory 630 may be based on any of the above described memory chips, or any other available memory chips capable of operating as described herein. The processor 620 may communicate with main memory 630 via a system bus. In some embodiments, the processor 620 communicates directly with main memory 630 via a memory port. In some embodiments, the device 600 may include one or more storage devices, such as a flash drive, a hard drive, a solid-state drive, an optical-disc drive and/or a USB drive.

The memory 630 may comprise an ACL 635. The ACL 635 is described in detail in relation to FIG. 4. The processor 620 may be able to read and write entries in the ACL 635. The ACL 635 may also be referred to as a list of backup channels. When the device 600 is operating at a regulated frequency, the device may select a channel in the ACL 635 that is available and quickly, e.g. in less than ten milliseconds, switch to that selected channel.

The memory 630 may further comprise instructions to perform scheduling and performing dynamic frequency selection channel availability checks. The instructions may perform off-channel availability check based on monitored wireless traffic. The instructions, when performed by the processor 620, may update the entries in the ACL 635.

Furthermore, the computing device 600 may include a network interface 640 to interface to a Local Area Network (LAN), Wide Area Network (WAN) or the Internet through a variety of connections including, but not limited to, standard telephone lines, LAN or WAN links (e.g., 802.11, T1, T3, 56kb, X.25), broadband connections (e.g., ISDN, Frame Relay, ATM), wireless connections, or some combination of any or all of the above. The wireless interface 605 may also be a type of network interface 640, and the network interface 640 may be wireless. The network interface 640 may comprise a built-in network adapter, network interface card, PCMCIA network card, card bus network adapter, wireless network adapter, USB network adapter, modem or any other device suitable for interfacing the computing device 600 to any type of network capable of communication and performing the operations described herein. For instance, the network interface 640 may be connected to a network 660 such as the Internet.

The device 600 may display output and accept input. In some embodiments, the device 600 may send output signals and accept input signals through the network interface 640 or the wireless interface 605. A wide variety of I/O devices may be present in the computing device 600. Input devices include keyboards, mice, trackpads, trackballs, microphones, touch-enabled displays and drawing tablets. Output devices include video displays, speakers, and printers. The I/O devices may be controlled by an I/O controller. The I/O controller may control one or more I/O devices such as a keyboard and a pointing device, e.g., a mouse or optical pen. Furthermore, an I/O device may also provide storage and/or an installation medium for the computing device 600. In still other embodiments, the computing device 600 may provide USB connections to receive handheld USB storage devices.

In some embodiments, the computing device 600 may comprise or be connected to multiple display devices, which each may be of the same or different type and/or form. As such, any of the I/O devices 130a-130n and/or the I/O controller may comprise any type and/or form of suitable hardware, software, or combination of hardware and software to support, enable or provide for the connection and use of multiple display devices by the computing device 600. For example, the computing device 100 may include any type and/or form of video adapter, video card, driver, and/or library to interface, communicate, connect or otherwise use the display devices. In one embodiment, a video adapter may comprise multiple connectors to interface to multiple display devices. In other embodiments, the computing device 600 may include multiple video adapters, with each video adapter connected to one or more of the display devices. In some embodiments, any portion of the operating system of the computing device 600 may be configured for using multiple displays. In other embodiments, one or more of the display devices may be provided by one or more other computing devices connected to the computing device 600, for example, via a network 660. These embodiments may include any type of software designed and constructed to use another computer's display device as a primary or a second display device for the computing device 600. In some embodiments, the device 600 will send user interface information via the network interface 640 or the wireless interface 605 that allows an administrator to set options on the device 600 over a network 660. One ordinarily skilled in the art will recognize and appreciate the various ways and embodiments that a computing device 600 may be configured to have multiple display devices.

In further embodiments, an I/O device may be a bridge between the system bus and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

The device 600 may comprise one or more operating systems, which control scheduling of tasks and access to system resources. The computing device 600 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS NT, WINDOWS CE, WINDOWS 7, WINDOWS 8, and WINDOWS 10, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Canonical Ltd. of London, United Kingdom, or any type and/or form of a Unix operating system, among others. In some embodiments, the device 600 may comprise an operating system designed for routers or wireless routers.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A method for scheduling dynamic frequency selection channel availability checks, comprising:
monitoring, by a wireless access point, wireless traffic traversing the wireless access point from one or more wireless client devices;
determining, by the wireless access point, to perform an off-channel availability check, based on the monitored wireless traffic;
selecting, by the wireless access point, a channel from a list of one or more usable channels; and
scanning, by the wireless access point, the selected channel for a protected signal for a predetermined time period, responsive to the determination;
wherein determining to perform the off-channel availability check further comprises identifying that the monitored wireless traffic does not include a lossy transmission protocol.

2. The method of claim 1, wherein determining to perform the off-channel availability check further comprises identifying that the monitored wireless traffic does not include an indication of priority above a predetermined threshold.

3. The method of claim 1, wherein determining to perform the off-channel availability check further comprises identifying a transmission boundary of the monitored wireless traffic.

4. The method of claim 3, wherein identifying the transmission boundary comprises identifying a pause in flow of the monitored wireless traffic.

5. The method of claim 3, wherein identifying the transmission boundary comprises identifying a closure of a connection at or above the network layer.

6. The method of claim 1, wherein determining to perform the off-channel availability check further comprises identifying, responsive to closure of a connection at or below the link layer, that the number of wireless client devices is below a predetermined threshold.

7. The method of claim 1, wherein determining to perform the off-channel availability check further comprises estimating a lull time remaining.

8. The method of claim 7, wherein determining to perform the off-channel availability check further comprises determining a lull time threshold based on a list of backup channels.

9. The method of claim 8, wherein determining to perform the off-channel availability check further comprises determining that the lull time is greater than the lull time threshold.

10. A system for scheduling dynamic frequency selection channel availability checks, the system comprising:
a wireless access point, comprising a network interface and a processor;
wherein the processor is configured to:
monitor wireless traffic traversing the wireless access point from one or more wireless client devices,
determine to perform an off-channel availability check, based on the monitored wireless traffic,
identify that the monitored wireless traffic does not include a lossy transmission protocol,
select a channel from a list of one or more usable channels, and
scan the selected channel for a protected signal for a predetermined time period, responsive to the determination.

11. The system of claim 10, wherein the processor is further configured to identify that the monitored wireless traffic does not include an indication of priority above a predetermined threshold.

12. The system of claim 10, wherein the processor is further configured to identify a transmission boundary of the monitored wireless traffic.

13. The system of claim 12, wherein the processor is further configured to identify a pause in flow of the monitored wireless traffic.

14. The system of claim 12, wherein the processor is further configured to identify a closure of a connection at or above the network layer.

15. The system of claim 10, wherein the processor is further configured to identify, responsive to closure of a connection at or below the link layer, that the number of wireless client devices is below a predetermined threshold.

16. The system of claim 10, wherein the processor is further configured to estimate a lull time remaining.

17. The system of claim 16, wherein the processor is further configured to determine a lull time threshold based on a list of backup channels, and determine that the lull time is greater than the lull time threshold.

18. The system of claim 17, wherein the protected signal comprises a radar signal.

19. A method for scheduling dynamic frequency selection channel availability checks, comprising:
   monitoring, by a wireless access point, wireless traffic traversing the wireless access point from one or more wireless client devices;
   determining, by the wireless access point, to perform an off-channel availability check, based on the monitored wireless traffic;
   selecting, by the wireless access point, a channel from a list of one or more usable channels; and
   scanning, by the wireless access point, the selected channel for a protected signal for a predetermined time period, responsive to the determination;
   wherein determining to perform the off-channel availability check further comprises identifying, responsive to closure of a connection at or below the link layer, that the number of wireless client devices is below a predetermined threshold.

20. A system for scheduling dynamic frequency selection channel availability checks, the system comprising:
   a wireless access point, comprising a network interface and a processor;
   wherein the processor is configured to:
      monitor wireless traffic traversing the wireless access point from one or more wireless client devices,
      identify, responsive to closure of a connection at or below the link layer, that the number of wireless client devices is below a predetermined threshold,
      determine to perform an off-channel availability check, based on the monitored wireless traffic,
      select a channel from a list of one or more usable channels, and
      scan the selected channel for a protected signal for a predetermined time period, responsive to the determination.

* * * * *